United States Patent [19]
Johnson

[11] Patent Number: 6,102,977
[45] Date of Patent: Aug. 15, 2000

[54] MAKE-UP AIR HANDLER AND METHOD FOR SUPPLYING BORON-FREE OUTSIDE AIR TO CLEAN ROOMS

[75] Inventor: Roy P. Johnson, Yacolt, Wash.

[73] Assignee: SEH America, Inc., Vancouver, Wash.

[21] Appl. No.: 09/099,458

[22] Filed: Jun. 18, 1998

[51] Int. Cl.⁷ .................................................. B08B 15/02
[52] U.S. Cl. ........................ 55/385.2; 55/385.1; 55/485; 55/486; 55/497; 55/DIG. 18
[58] Field of Search ................................. 55/385.1, 385.2, 55/485, 486, 487, 497, 500, 522, DIG. 18; 454/187

[56] References Cited

U.S. PATENT DOCUMENTS

| | | |
|---|---|---|
| 3,975,995 | 8/1976 | Shuler . |
| 4,060,025 | 11/1977 | Pelosi, Jr. . |
| 4,061,082 | 12/1977 | Shuler . |
| 4,171,963 | 10/1979 | Schuler . |
| 4,319,899 | 3/1982 | Marsh . |
| 4,344,784 | 8/1982 | Deckas et al. . |
| 4,560,395 | 12/1985 | Davis . |
| 4,620,869 | 11/1986 | Goossens et al. . |
| 4,681,609 | 7/1987 | Howeth . |
| 4,693,175 | 9/1987 | Hashimoto . |
| 4,724,749 | 2/1988 | Hedrick . |
| 4,747,341 | 5/1988 | Hedrick . |
| 4,801,312 | 1/1989 | Mateson ................................. 55/385.2 |
| 4,832,717 | 5/1989 | Peters . |
| 4,883,513 | 11/1989 | Monson et al. . |
| 4,946,484 | 8/1990 | Monson et al. . |
| 5,029,518 | 7/1991 | Austin . |
| 5,086,692 | 2/1992 | Welch et al. . |
| 5,167,681 | 12/1992 | O'Keefe et al. . |
| 5,259,812 | 11/1993 | Kleinsek ................................. 454/187 |
| 5,279,632 | 1/1994 | Decker et al. . |
| 5,312,465 | 5/1994 | Riutta . |
| 5,456,280 | 10/1995 | Palmer . |
| 5,507,847 | 4/1996 | George et al. .............................. 55/486 |
| 5,525,136 | 6/1996 | Rosen ........................................ 55/486 |
| 5,591,244 | 1/1997 | Vross et al. ................................ 55/485 |
| 5,626,820 | 5/1997 | Kenkead et al. ....................... 55/385.2 |
| 5,730,770 | 3/1998 | Greisz ........................................ 55/486 |
| 5,762,664 | 6/1998 | Vross et al. ................................ 55/485 |
| 5,827,118 | 10/1998 | Johnson et al. ........................ 55/385.2 |
| 5,858,040 | 1/1999 | Hansen ................................... 55/385.2 |

OTHER PUBLICATIONS

Webster's Ninth New Collegiate Dictionary, by Merriam–Webster Inc., 1991, p. 169 and p. 746.

*Primary Examiner*—David A. Simmons
*Assistant Examiner*—Minh-Chau T. Pham
*Attorney, Agent, or Firm*—Oliff & Berridge, PLC

[57] ABSTRACT

A make-up air handler for supplying outside air to clean environments such as clean rooms in semiconductor fabrication facilities includes a flow passage through which the outside air is passed. At least one filter is disposed to filter the outside air passing through the flow passage. The make-up air handler preferably includes all boron-free filters to prevent the introduction of boron into the outside air by the filters. The make-up air handler can include boron-free ULPA filters to provide highly clean boron-free outside air for supplying to clean environments. The make-up air handler can be operated in a normal manner at air velocities exceeding the rated velocities of the ULPA filters, without subjecting the ULPA filters to air velocities exceeding their ratings, due to the configuration and arrangement of the ULPA filters in the flow passage. Accordingly, highly clean outside air can be provided at normal volumetric flow rates without high energy losses associated with above-rated velocity air flows through the ULPA filters.

25 Claims, 2 Drawing Sheets

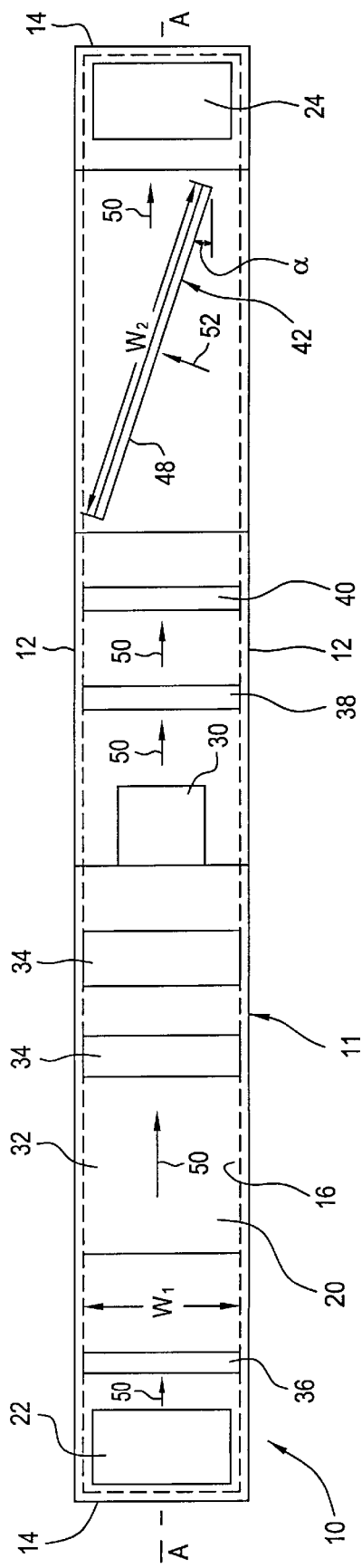
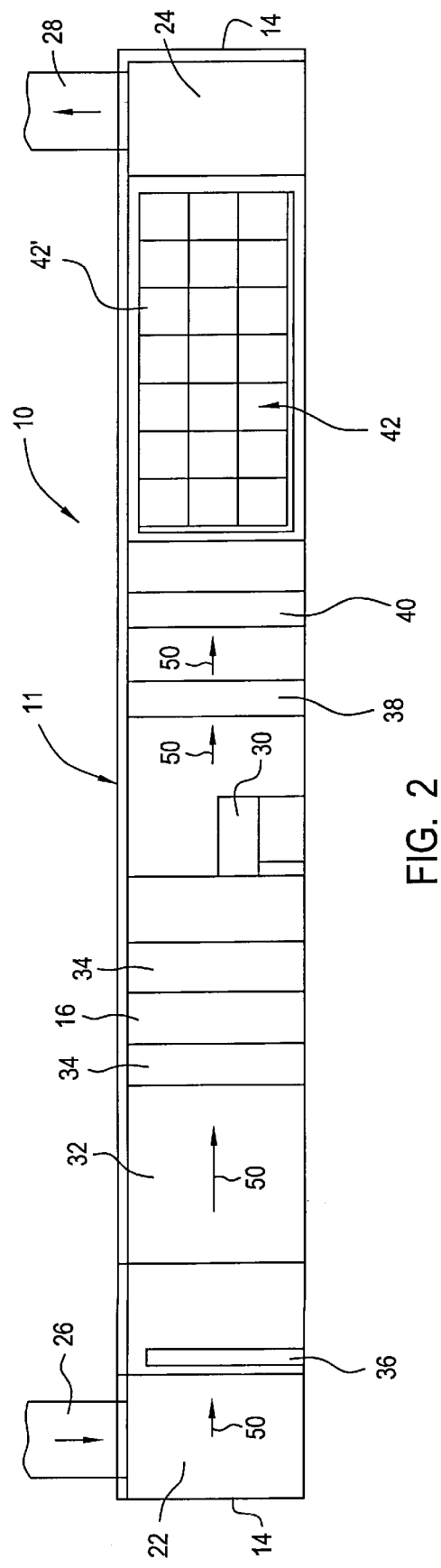
FIG. 1
FIG. 2

MAKE-UP AIR HANDLER AND METHOD FOR SUPPLYING BORON-FREE OUTSIDE AIR TO CLEAN ROOMS

BACKGROUND OF THE INVENTION

1. Field of Invention

This invention is directed to air conditioning systems and, more particularly, to a make-up air handler and method for supplying outside air to clean environments such as clean rooms in semiconductor manufacture facilities.

2. Description of Related Art

In certain industries such as semiconductor manufacture, it is necessary to maintain highly clean manufacturing environments (clean rooms) to prevent contamination of materials and fabricated devices. Outside air is supplied to clean rooms by make-up air handlers (primary air handlers) which are located external to the clean rooms. Make-up air handlers perform important functions; namely, filtering the outside air to a desired rating; controlling the humidity of the outside air supplied to clean rooms; maintaining a sufficient air pressure in the clean rooms to prevent their contamination by air flow from rooms at lower air pressures; and compensating for the loss of exhausted air from the clean rooms during the operation of processing equipment in the clean rooms. The filtered outside air is passed from make-up air handlers to secondary air handlers which typically include ceiling-mounted filter units in the clean rooms. The secondary air handlers further filter the outside air before it is introduced into the clean rooms, and also circulate and filter the air within the clean rooms to maintain a desired air class.

In the fabrication of semiconductor wafers and microelectronic devices, metallic and metalloid dopant materials are added to the semiconductor materials to achieve desired electrical properties. For example, boron and aluminum are added to silicon to form p-type semiconductor material, and arsenic, antimony and phosphorus are added to silicon to form n-type material. Because very small amounts of dopants can significantly affect the properties of semiconductor materials, it is important that the dopants be added to the semiconductor materials in closely controlled amounts. In addition, it is important that dopants are not unintentionally introduced into the semiconductor materials.

Semiconductor material purity continues to become increasingly important as device size continues to decrease. Parts per million levels of impurities are often intolerably high in device quality material. Accordingly, it is important to eliminate potential sources of dopants and other impurities that may introduce dopants into clean rooms, where such dopants can contaminate semiconductor materials and make the materials unsuitable for their intended uses.

A potential source of dopants and other impurities for clean rooms is the filtered outside air which is supplied into the cleans rooms through air supply systems including make-up air handlers and secondary air handlers. Although these air handlers can filter the air to a high level of cleanliness and achieve low ratings of the air (number of particles of a specified size per unit volume of air) in the clean rooms, the air supply system can itself be a source of dopants introduced into clean rooms.

More particularly, standard high-efficiency particulate air (HEPA) and ultralow penetration air (ULPA) filters used in make-up air handlers comprise boron-containing fibers. Boron can outgas from the filters and enter the air stream during filtration. The entrained boron can be carried downstream into the clean rooms, where it can contaminate semiconductor materials.

There are known filter materials designed for use in secondary air handler systems that are free of certain dopants. For example, U.S. Pat. No. 5,507,847 discloses a filter that is boron-free, although there is no disclosure of any problems associated with the presence of boron in the filter with respect to the contamination of semiconductor materials. The disclosed filter can be used at air velocities less than about 200 ft/min. Although the disclosed filter can provide boron-free filtered air in secondary air handlers, the air supplied downstream to the secondary air handlers from known make-up air handlers can contain boron, which can be introduced into clean rooms despite the presence of the boron-free filters in the secondary air handlers.

Accordingly, in order to eliminate the presence of boron in air supply systems for clean rooms, including the make-up and secondary air handlers, it is desirable to provide a make-up air handler that is not a potential source of boron contamination of the outside air. However, as stated, known filters used in make-up air handlers are not boron-free. In addition, the make-up air handlers typically operate at air velocities of about 500 ft/min. This rating is significantly higher than the rating of the boron-free filter disclosed in U.S. Pat. No. 5,507,847. Consequently, using the disclosed filter in a make-up air handler according to its intended manner of use at such a higher air velocity, substantially exceeding the rated velocity of the filter, would result in substantial increases in the pressure drop across the filter and associated energy losses. Accordingly, it would be energy inefficient to use the disclosed filter in its intended manner in a make-up air handler.

It is also desirable to provide a boron-free ULPA filter in a make-up air handler to prolong the service life of the filters in the secondary air handlers. That is, by removing particles at a high efficiency at the make-up air handler stage, the particulate level in the air carried to the secondary air handlers would be reduced, thus prolonging the service life of the filters in the secondary air handlers. Prolonging the service life of these filters would provide important cost savings associated with replacing the secondary filters when they become clogged. These costs include the substantial cost of the filters, labor costs to replace the filters, and costs due to downtime of the clean rooms during the replacement of filters. In addition, providing a boron-free ULPA filter in a make-up air handler would provide consistent air conditions in the clean rooms, despite changes in the condition of the outside air due to weather and air quality changes.

Thus, there is a need for a make-up air handler for supplying outside air to clean environments such as clean rooms in semiconductor manufacturing facilities that does not introduce undesirable substances such as dopants into the outside air, and that can utilize known filters and not subject such filters to air velocities exceeding their rated velocities, such that the make-up air handler provides the filtering properties of the filters without requiring significantly increased energy consumption by the make-up air handler in order to use the filters.

SUMMARY OF THE INVENTION

One object of this invention is to provide a make-up air handler that satisfies the above needs. Particularly, the make-up air handler does not introduce certain substances, that are undesirable impurities in semiconductor materials, into the outside air that is filtered by the make-up handler. For example, the make-up air handler can utilize all boron-free filters to prevent the introduction of boron into the outside air by the filters. The filters can be free of other selected substances as well.

In addition, the filters used in the make-up air handler are not subjected to air velocities exceeding their rated air velocities. Accordingly, the make-up air handler can provide the filtering properties of the boron-free filters without subjecting the filters to air velocities that would result in substantially increased pressure drops across the filters and associated increased energy consumption by the make-up air handler, as compared to the energy consumption that occurs when using the filters at no higher than their rated air velocities.

The make-up air handler can utilize high-efficiency, boron-free filters. Accordingly, the make-up air handler can provide boron-free outside air that is typically suitable for introduction directly to a clean environment, although the filtered air is typically passed to secondary air handlers including high-efficiency filters that further filter the outside air before introducing it into the clean environment. The outside air supplied to secondary air handlers places reduced filtering demands on the secondary air handlers as compared to known make-up air handlers, thereby prolonging the service life of the filters in the secondary air handlers. Accordingly, the make-up air handler can reduce costs associated with the replacement of the filters in the secondary air handlers.

According to an aspect of this invention, an embodiment of the make-up air handler comprises a flow passage and least one air filter disposed to remove particulate from the outside air passed through the flow passage. Each filter can be composed of a filter material that is free of undesired impurities in semiconductor materials. For example, the filters can each contain no metals or metalloids so that the filters introduce none of such impurities into the outside air passing through the flow stream passage. Consequently, the outside air that is typically passed to secondary air handlers is free of the selected substances. The filters are typically arranged in a plurality of stages having different filtration efficiencies to progressively filter the outside air as it passes through the flow passage. According to another aspect of this invention, embodiments of the make-up air handler can comprise known ULPA boron-free filters, and not subject the boron-free filters to velocities exceeding their rated velocities during normal operation of the make-up air handler. This can be achieved by providing ULPA filters having a cross-sectional flow area exceeding the cross-sectional area of the flow passage. Accordingly, the make-up air handler can provide highly clean, boron-free outside air using known filters.

Another object of this invention is to provide an air filtration system for supplying outside air to clean environments that comprises a make-up air handler according to this invention, and a secondary air handler. The secondary air handler preferably also includes filters that are free of the selected impurities, so that the outside air that is supplied into the clean environments contains none of these impurities.

Yet another object of this invention is to provide a method of supplying impurity free outside air to a clean environment which utilizes the make-up air handler according to this invention.

These and other aspects of this invention will be apparent from the following detailed description.

BRIEF DESCRIPTION OF THE DRAWINGS

Preferred embodiments of this invention will be described in detail, with reference to the following figures, in which:

FIG. 1 is a top view of a make-up air handler according to an embodiment of this invention;

FIG. 2 is a side view of the make-up air handler of FIG. 1; and

DETAILED DESCRIPTION OF PREFERRED EMBODIMENTS

Figure 3:
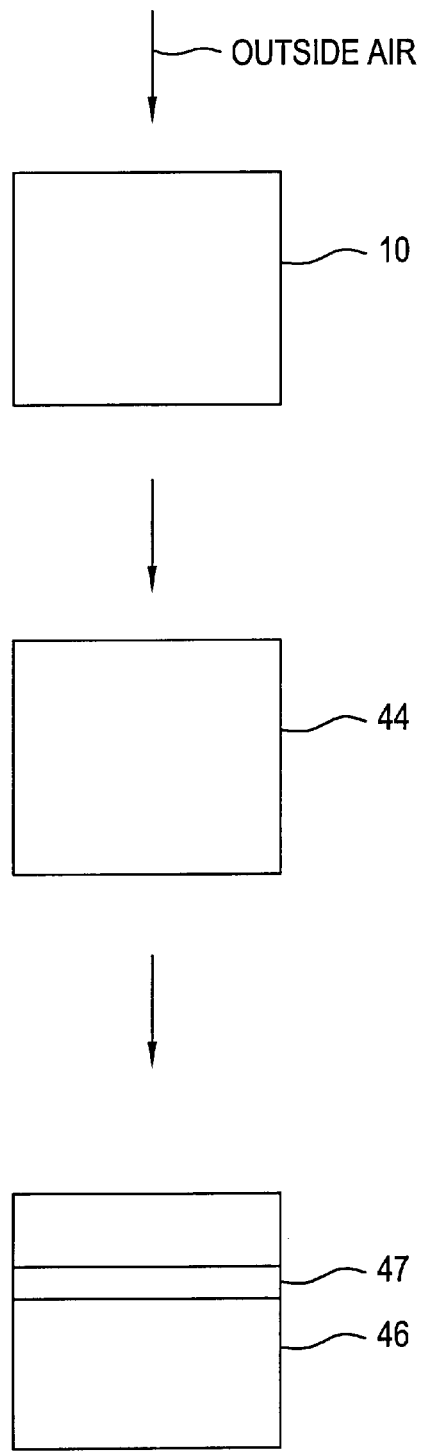
FIG. 3 is a flow diagram of an air supply system including a make-up air handler shown in FIGS. 1 and 2.

This invention provides an improved make-up air handler for supplying outside air to clean environments such as semiconductor and pharmaceutical manufacturing facilities. The make-up air handler is particularly suitable for supplying filtered air to clean and ultra clean environments such as clean rooms in semiconductor wafer fabricating facilities.

FIGS. 1 and 2 illustrate a make-up air handler (primary air handler) 10 according to an embodiment of this invention. In service, the make-up air handler is located external to the clean environment to which the make-up air handler 10 supplies filtered outside (outdoors) air. The make-up air handler 10 comprises an outer housing 11 which includes opposed side walls 12, opposed end walls 14, a top wall 16 and a bottom wall 18. The illustrated housing 11 has a generally elongated rectangular configuration. The housing 11 can have various other configurations such as a tubular configuration as well.

The housing 11 defines a flow passage 20 which extends longitudinally along the housing 11. The flow passage 20 includes an inlet opening 22 and an outlet opening 24. Outside air flows into the inlet opening 22 through an outside air supply conduit 26. The outside air flows along the flow passage 20 as depicted by arrows and is exhausted from the make-up air handler through the outlet opening 24. The outlet opening 24 is typically connected to an exhaust conduit 28, in flow communication with a secondary air handler 44 (FIG. 3) downstream from the make-up air handler 10.

The make-up air handler 10 includes a motor driven fan 30 to draw the outside air through the flow passage 20 at a desired flow rate, typically at a desired volumetric flow rate. Typically, the outside air is flowed through the flow passage 20 at an air velocity of from about 300–700 ft/min by operation of the fan 30. The outside air is preferably flowed at an air velocity of 500 ft/min.

The make-up air handler 10 provides sufficient one-pass outside air flow to maintain a desired elevated pressure in the clean environment. The make-up air handler 10 also supplies a sufficient flow of outside air to replace that is exhausted from the clean environment during the operation of process equipment contained in the clean environment.

In addition to supplying a sufficient amount of outside air to the clean environment, the make-up air handler 10 typically controls the humidity of the outside air. The make-up air handler 10 can include a humidifier unit to control the humidity of the outside air supplied to clean environments. The humidifier unit can supply clean environments with outside air having a consistent humidity level. The humidifier unit typically includes a humidifier 32 and one or more humidity control sections 34 to increase or decrease the humidity of the outside air passed through the flow passage 20 depending on the outdoors humidity level and the desired humidity level in the clean environment.

The make-up air handler 10 typically includes multiple filtration stages for filtering the outside air to the desired level of cleanliness before it is passed to secondary air handlers. The make-up air handler 10 can include two or more filtration stages, with each successive stage having an increased filtering efficiency. The illustrated make-up handler includes four filters 36, 38, 40 and 42. For example, the filter 36 can have an efficiency of 50% at 3 microns, the filter 38 an efficiency of 95% at 0.5 microns, the filter 40 the same or a higher efficiency than that of the filter 38, and the filter 42 an efficiency of 99.9995% at 0.2 microns. The number of filtration stages and the filtering efficiencies of each stage are determined based on the desired air cleanliness classification of the air supplied to the clean environment.

Referring to FIG. 3, following the final stage of filtration, the filtered outside air is passed to a secondary air handler 44. The secondary air handler 44 includes at least one filter 47 to further filter the outside air before it is introduced into the clean environment 46, and also filter the air contained in the clean environment.

According to an aspect of this invention, the make-up air handler 10 includes filters in each of the different filters 36, 38, 40 and 42 that are free of certain substances so that such substances are not introduced into the outside air passing through the flow passage by the filters. When the make-up air handler 10 is used to supply outside air to a clean room of a semiconductor wafer fabricating facility, the filters are free of certain substances that can have undesirable effects on the electrical properties, and also the crystallinity, of semiconductor materials fabricated in the clean rooms. For example, dopants are added to silicon to form p-type and n-type semiconductor materials. As dopants significantly affect the electrical properties of silicon, the amount of dopants that are intentionally added to silicon must be closely controlled to achieve desired electrical properties. Accordingly, when dopants are added intentionally to semiconductor materials, the amount of the dopants that is added must be known with certainty. For such doped materials, it is important that no additional dopant be unintentionally introduced into the semiconductor with the desired additions. Furthermore, in semiconductor materials in which the presence of certain substances, such as metals and metalloids, is not desired, it is important that such substances not be unintentionally introduced into such semiconductor materials during processing. For example, boron and aluminum (acceptor elements) are added to silicon to make p-type semiconductor material, and it undesirable for these elements to be unintentionally added to silicon during the fabrication of n-type semiconductor materials. Transition metals are damaging impurities in silicon wafers. Metalloids such as silicon, boron, germanium and arsenic can be intentionally added as desired dopants in semiconductor materials in some instances, but can be undesired impurities in semiconductor materials in other instances.

The make-up air handler 10 according to this invention can eliminate the outside air supplied to secondary air handlers as a potential source of certain substances that can contaminate semiconductor materials processed in clean environments such as clean rooms. In addition, the make-up air handler 10 can provide a high air filtering efficiency so that the outside air that is supplied to secondary air handlers requires less demanding additional filtering. The outside air that exits the make-up air handler 10 can have a cleanliness classification that is typically sufficient for introduction directly to a clean room without requiring further particulate removal by secondary air handlers. Accordingly, the make-up air handler 10 can reduce the filtering demands placed on secondary air handlers and, consequently, prolong the service life of such secondary air handlers.

The make-up air handler 10 preferably includes no filters that contain certain substances that are to be prevented from being introduced into the clean environment. For example, the filters can be boron-free. The filters 36, 38, 40 and 42 can comprise filter materials that contain no boron. As explained, the filtration stages can have selected efficiencies to progressively further clean the outside air as it flows along the flow passage. The filter 42 is typically the final stage. The filter 42 can comprise one or more individual filters that filter the outside air passed through the previous upstream filters 36, 38 and 40 to the desired cleanliness classification to pass to secondary air handlers.

The filter 42 preferably comprises one or more boron-free ULPA filters as disclosed in U.S. Pat. No. 5,507,847. The filters can be composed of one or more layers of microporous material such as fluoropolymers. The filters can have a pore size to achieve a filtration efficiency of at least 99.99% at 0.1 micron. The filters preferably have an efficiency of at least about 99.9995% at a particle size of 0.2 microns and smaller. Accordingly, the outside air that is discharged from the make-up air handler 10 can be at an air cleanliness level that is sufficient for introduction directly into a clean environment.

The filters disclosed in U.S. Pat. No. 5,507,847 are designed for use at air velocities up to from about 100 ft/min to about 200 ft/min. As described above, the air velocity through the flow passage 20 of the make-up air handler 10 is typically about 500 ft/min. Accordingly, the disclosed filters are not appropriate for filtering air in the make-up air handler 10 at such typical air velocities, because the associated pressure drop caused by the filters would be substantially increased at air velocities above their rated velocity and would be extremely high at typical air velocities used in the make-up air handler 10.

This invention overcomes this problem and enables the boron-free filters disclosed in U.S. Pat. No. 5,507,847 to be used in the make-up air handler 10 operated at typical air velocities through the flow passage of about 300 ft/min to about 700 ft/min and even greater, without subjecting the filters to air velocities above their rated velocity. This solution is achieved by arranging at least one of the filters in the flow passage such that the cross-sectional flow area, A, through the filter allows the desired volumetric flow rate, Q, through the filter, and at the same time allows the air velocity, v, through the filter to not exceed the rated velocity of the filter (i.e., $v=Q/A$). By increasing A, at a constant value of Q, v is decreased to less than the air velocity through the flow passage upstream and downstream of the filter.

As shown in FIG. 1, the cross-sectional flow area at the filter 42 is increased by orienting the filter 42 relative to the longitudinal axis A—A of the make-up air handler 10 and to the air flow direction 50 in the flow passage 20 from the inlet opening 22 up to about the filter 40, such that the inlet face 48 of the filter 42 is not perpendicular to the air flow direction upstream of the filtration stage 40, as in the manner the filter is designed to be used (as shown for the filtration stages 36, 38 and 40 upstream of the filter). The outside air is caused to flow in the direction 52 through the filter 42, substantially perpendicular to the inlet face 48. The flow direction of the outside air can be varied from direction 50 to 52, for example, by the use of suitable air deflectors (not shown) disposed in the flow passage 20 between the filter 40 and the filter 42.

The cross-sectional flow area at the inlet face 48 and though the thickness of the filter 42 exceeds the cross-sectional area of the flow passage 20 along the direction 50. Typically, the filter 42 has about the same height as that of the filters 36, 38 and 40, and the cross-sectional flow area of the filter 42 is increased relative to that of the filters 36, 38 and 40 and the flow passage 20 by making the width $W_2$ of the filter 42 greater than the width $W_1$ of the flow passage 20. Orienting the filter 42 at an acute angle $\alpha$ relative to the direction 50 enables the relatively larger filter 42 to be used in the flow passage 20 having a narrower width $W_1$ than the width $W_2$ of the filter 42. Accordingly, due to its larger cross-sectional flow area, the velocity of air flow through the filter 42 is decreased as compared to that through the filters 36, 38 and 40. By varying $\alpha$ and $W_2$, the air velocity can be varied so that it does not exceed the rated velocity of the filter 42 and cause excessive pressure drops by the filter 42.

As an example, the filters 36, 38 and 40 can each have a width of about 6 ft and the filter 42 can have a width of about 14 ft, to achieve an air flow velocity of about 500 ft/min through the filters 36, 38 and 40, and an air flow velocity of from about 100 ft/min to about 200 ft/min through the filter 42.

The filter 42 can include a plurality of individual filters 42'. As shown, in FIG. 2, the individual filters 42' can be mounted within a housing 54 and arranged in a planar configuration to provide the desired total cross-sectional flow area at the inlet face 48 to achieve the desired air velocity. The size of the filters 42' and, thus, the number of the filters 42' can be varied to achieve the desired flow velocity through filter 42.

The outside air that flows through the filter 42 is deflected by the housing 11 and caused to flow generally along the direction 50 so that it is exhausted through the outlet opening 24. The air velocity of the outside air increases to the normal operating air velocity through the flow passage 20 (and through the filters 36, 38 and 40) downstream of the filter 42.

Thus, this invention provides a make-up air handler 10 that can supply boron-free outside air of a desired classification, and not have to operate below the typical or rated volumetric air flow and air velocity of the make-up air handler 10. Consequently, the make-up air handler 10 can supply a sufficient air supply of outside air to clean environments such as clean rooms to maintain the desired pressure in the clean environments and to replace exhausted air.

In order to ensure that the outside air supplied into the clean environments is free of certain undesired substances, the filters used in the secondary air handlers downstream from the make-up air handler can have the same composition as the filter 42 of the make-up air handler 10. Preferably, the secondary air handler includes boron-free filters as disclosed in U.S. Pat. No. 5,507,847. The secondary air handler can include filters having the same or greater filtering efficiency as the filter 42, so that any sub-micron particles that pass through the filter 42 can be removed by the secondary air handlers and not be introduced into the clean environments. Consequently, the clean environment can have a minimal air cleanliness rating and also be boron-free.

It will be appreciated by those skilled in the art that the filters included in make-up air handler can have compositions that are free of materials other than boron to also or alternately prevent these other materials from being introduced into clean environments as well. For example, the filters can be free of metallic elements including the transition elements. The filters can be free of metalloid elements including boron, silicon, germanium, arsenic and the like, that are commonly added as donor or acceptor impurities to semiconductor materials. The filters can also be free of other metallic and metalloid impurity elements that do not have beneficial doping effects in semiconductor materials and whose presence is undesirable.

While this invention has been described in conjunction with the specific embodiments described above, it is evident that many alternatives, modifications and variations are apparent to those skilled in the art. Accordingly, the preferred embodiments of this invention as set forth above are intended to be illustrative and not limiting. Various changes can be made without departing from the spirit and scope of this invention.

What is claimed is:

1. An air filtration system for supplying filtered air to a clean environment, comprising:

a make-up air handler, including:
  a flow passage having an inlet end through which outside air is introduced into the flow passage and an outlet end through which the outside air is exhausted from the flow passage; and
  at least one air filter disposed to remove particulate from the outside air passing through the flow passage, each air filter being composed of a boron-free filter material;
  wherein no boron is introduced into the outside air passing through the flow passage by the at least one filter; and
a secondary air handler in communication with the make-up air handler, the secondary air handler filtering the outside air passed through the at least one air filter of the make-up air handler before supplying the outside air into the clean environment.

2. The make-up air handler of claim 1, wherein the boron-free filter material is a fluoropolymer.

3. The make-up air handler of claim 1, wherein the at least one air filter has a filtration efficiency of at least about 99.9995% at about 0.2 microns.

4. The make-up air handler of claim 1, wherein the at least one air filter has less than about 0.6 inch water pressure drop at an air velocity of the outside air of less than 200 ft/min.

5. The make-up air handler of claim 1, wherein the at least one air filter comprises at least one first filter composed of a boron free material and at least one second filter composed of a boron free material, and further comprising:

a first filtration stage including at least one first filter, each first filter having an efficiency at a selected particle size; and a second filtration stage downstream of the first filtration stage and including at least one second filter, each second filter having an efficiency greater than that of the at least one first filter at the selected particle size.

6. The make-up air handler of claim 5, wherein the second filtration stage has a cross-sectional flow area that is greater than the cross-sectional flow area of the first filtration stage such that the air velocity of the outside air through the second filtration stage is less than the air velocity of the outside air through the first filtration stage, and the air velocity of the outside air in the flow passage downstream of the second filtration stage is approximately equal to the air velocity of the outside air through the first filtration stage.

7. The make-up air handler of claim 5, wherein each of the second filters of the second filtration stage includes an inlet face oriented at an acute angle relative to a flow direction of the outside air through the first filtration stage in the flow passage.

8. The make-up air handler of claim 5, wherein each of the second filters of the second filtration stage has a filtration efficiency of at least about 99.9995% at about 0.2 microns, and less than about 0.6 inch water pressure drop at an air velocity of the outside air of less than 200 ft/min.

9. An air filtration system for supplying outside air to a clean room in which semiconductor materials are fabricated, comprising:
   a make-up air handler, including:
      a flow passage having an inlet end through which outside air is introduced into the flow passage and an outlet end through which the outside air is exhausted from the flow passage; and
      at least one air filter disposed to remove particulate from the outside air passing through the flow passage, each air filter being composed of a material that contains no metallic or metalloid elements that are undesired impurities when present in the semiconductor materials;
      wherein none of the undesired impurities are introduced into the outside air passing through the flow passage by the at least one filter; and
   a secondary air handler in flow communication with the make-up air handler, the secondary air handler filtering the outside air passed through the at least one air filter of the make-up air handler before supplying the outside air into the clean environment.

10. An air filtration system for supplying filtered air to a clean environment, comprising:
   a make-up air handler, including:
      a flow passage having an inlet end through which outside air is introduced into the flow passage and an outlet end through which the outside air is exhausted from the flow passage; and
      at least one air filter disposed to remove particulate from outside air passing through the flow passage, each air filter being composed of a boron-free filter material such that each air filter introduces no boron into the outside air;
   a secondary air handler disposed downstream from the make-up air handler, the secondary air handler including a boron-free air filter for filtering the outside air passed through the at least one air filter of the make-up air handler before supplying the outside air into the clean environment; and
   means for transporting the outside air between the make-up air handler and the secondary air handler;
   wherein no boron is introduced into the outside air by the filters of the make-up air handler and the secondary air handler.

11. The air filtration system of claim 10, wherein the boron-free filter material is polytetrafluoroethylene.

12. The air filtration system of claim 10, wherein the at least one air filter of the make-up air handler and the air filter of the secondary air handler each have a filtration efficiency of at least about 99.9995% at about 0.2 microns.

13. The air filtration system of claim 10, wherein the at least one air filter of the make-up air handler has less than about 0.6 inch water pressure drop at an air velocity of less than 200 ft/min.

14. A method of supplying outside air to a clean environment in which semiconductor materials are fabricated, comprising:
   providing a make-up air handler including:
      a flow passage having an inlet end and an outlet end; and
      at least one air filter disposed in the flow passage, each air filter being composed of a boron-free filter material;
   introducing outside air into the flow passage of the make-up air handler at the inlet end;
   passing the outside air through the at least one air filter to filter particulate from the outside air and to introduce no boron into the outside air from each air filter;
   exhausting the filtered outside air from the flow passage at the outlet end;
   passing the exhausted filtered outside air from the make-up air handler to a secondary air handler in flow communication with the make-up air handler, the secondary air handler including a filter;
   passing the exhausted filtered outside air through the filter of the secondary air handler to further filter the outside air; and
   introducing the outside air that has passed through the filter of the secondary air handler into the clean environment.

15. The method of claim 14, wherein the boron-free filter material is polytetrafluoroethylene.

16. The method of claim 14, wherein the at least one air filter has a filtration efficiency of at least about 99.9995% at about 0.2 microns.

17. The method of claim 16, wherein the outside air is passed through the at least one air filter of the make-up air handler at an air velocity of less than 200 ft/min, and the pressure drop through each air filter is less than about 0.6 inch water.

18. The method of claim 17, wherein the air velocity of the outside air in the flow passage upstream and downstream of the at least one air filter is greater than the air velocity of the upstream air passing through the at least one air filter.

19. The method of claim 14, wherein:
   the secondary air handler including a boron-free air filter; and
   the method further comprises:
      passing the exhausted filtered outside air through the boron-free air filter of the secondary air handler to further filter the outside air; and
      introducing the outside air that has passed through the boron-free filter of the secondary air handler into the clean environment.

20. The method of claim 14, wherein the clean environment is a clean room and the semiconductor material is silicon.

21. An air filtration system for supplying filtered air to a clean environment, comprising:
   a make-up air handler, including:
      a flow passage through which outside air is flowed in a flow direction, the flow passage having a cross-sectional flow area;
      a first filter in the flow passage to remove particulate from outside air passing through the flow passage, the first filter being composed of a boron-free filter material such that the first air filter introduces no boron into the outside air, the outside air passing through the first filter at a first air velocity; and
      a second filter in the flow passage to remove particulate from the outside air passing through the flow passage, the second filter being composed of a boron-free filter material such that the second air filter introduces no boron into the outside air, the second filter having a cross-sectional flow area greater than the cross-sectional flow area of the flow passage and the second filter being oriented at an angle in the flow passage relative to the flow direction, such that the outside air passing through the second filter at a second air velocity less than the first air velocity; and a secondary air handler in flow communication with the make-up air handler, the secondary air handler including a filter that filters the outside air passed through the first air filter and the second air filter of the make-up air handler before supplying the outside air into the clean environment.

22. The air filtration system of claim 21, wherein the first air velocity is from about 300 ft/min to about 700 ft/min and the second velocity is less than about 200 ft/min.

23. The air filtration system of claim 21, wherein the filter of the secondary air handler is a boron-free air filter, and no boron is introduced into the outside air by the filters of the make-up air handler and the secondary air handler.

24. The air filtration system of claim 21, wherein the boron-free filter material is polytetrafluoroethylene.

25. The air filtration system of claim 21, wherein the second air filter of the make-up air handler has a filtration efficiency of at least about 99.9995% at about 0.2 microns.

* * * * *